United States Patent Office 3,071,625
Patented Jan. 1, 1963

3,071,625
SULFIDE CLEAVAGE
Metro D. Kulik and Martin B. Neuworth, Pittsburgh, Pa., assignors to Consolidation Coal Company, Pittsburgh, Pa., a corporation of Pennsylvania
No Drawing. Filed Mar. 8, 1961, Ser. No. 94,164
13 Claims. (Cl. 260—609)

This invention relates to the sulfide cleavage of alkyl aryl sulfides. More specifically, it relates to the splitting off of a branched-chain alkyl group attached to the sulfur atom of an alkyl aryl sulfide in the presence of specific sulfide cleavage acid catalysts.

The term "branched-chain alkyl" as used herein refers to an alkyl group whose attaching carbon atom is a secondary or tertiary carbon atom. In C-alkylated thiophenols, the carbon atom of this alkyl group is attached to a nuclear carbon atom (ring). In S-alkylated thiophenols, the carbon atom of the alkyl group is attached to the sulfur atom (sulfide).

The preparation of ring-alkylated thiophenols substituted in the para position of the ring with a t-alkyl group has been described in copending applications Serial Nos. 70,413, 70,405, and 70,443, all filed November 21, 1960, and assigned to the assignee of this invention. The preparation of ring-alkylated thiophenols alkylated in the ortho position of the ring with a sec-alkyl group has been described in copending applications Serial Nos. 70,424, 70,404, and 70,425, all filed November 21, 1960, and assigned to the assignee of this invention. In the foregoing processes for preparing ring-alkylated thiophenols, varying amounts of S-alkylated thiophenols, i.e., alkyl aryl sulfides, are produced. Sulfide cleavage is of utility in regenerating the starting thiophenol from the sulfide for recycle in the process for ring-alkylating thiophenols. This invention is of further utility as a step in accomplishing the hitherto unknown separation and recovery of individual thiocresol isomers from mixed thiocresols, as shown in copending application Serial No. 70,657, filed November 21, 1960. In this isomer separation process, a mixture of thiocresol isomers is catalytically reacted with a t-alkyl-generating olefin, only the orthothiocresol isomer being alkylatable in the ring. The meta- and parathiocresols form their t-alkyl sulfides. This invention provides the means for separately recovering both meta- and parathiocresols by individual sulfide cleavage of their respective t-alkyl sulfides.

In marked contrast to the alkyl aryl ethers, e.g., anisole, isopropyl phenyl ether, etc., where side-chain carbon-oxygen cleavage readily occurs, in alkyl aryl sulfides the side-chain carbon sulfur bond is cleaved with considerable difficulty. A reductive sulfide cleavage of alkyl aryl sulfides is known wherein a primary group, e.g., methyl may be removed from a compound such as thioanisole by using a reducing agent, e.g., an alkali metal dissolved in a nitrogenous solvent. Exemplary reducing agents are sodium-liquid ammonia, sodium-pyridine, and lithium-methylamine. The temperature at which these reducing agents are employed is generally determined by the boiling point of the solvent; e.g., sodium-liquid ammonia is generally used at −33° C., the atmospheric boiling point of ammonia; pyridine is used at 115° C., its reflux temperature, etc. These reducing agents are basic in nature and operate by a different mechanism from the specific acid catalysts that characterize this invention in that hydrogenolytic cleavage occurs with these basic reducing agents. Thus when a t-butyl group is cleaved in the presence of sodium-liquid ammonia, isobutylene is not formed, but rather butanes and octanes primarily. These basic reducing agents are not ordinarily as desirable for use as the specific acid catalysts of this invention because the olefins ordinarily derivable from the cleaved alkyl groups are not recoverable as such. Further, the use of these alkali metal-solvent pairs is less convenient compared with use of the catalysts of this invention. Also, the alkali metal-solvent pairs may adversely affect other groups present on the ring, such as halogen.

Experiments have also been reported [D. S. Tarbell and D. P. Harnish, J. Am. Chem. Soc. 74, 1862 (1952)] intended to elucidate a mechanism of cleavage of the carbon-sulfur bond in various phenyl alkyl and phenyl aralkyl sulfides. Aluminum bromide in chlorobenzene, aqueous hydrobromic acid, and hydrogen bromide in acetic acid solution were among the systems studied. The results obtained, characterized by poor yields and thiophenol degradation, emphasize the difficulties involved in obtaining an effective cleavage process of commercial interest.

Accordingly, it is an object of the present invention to provide a method for the effective sulfide cleavage of branched-chain S-alkylated thiophenols.

It is a further object to provide a method for effectively cleaving a t-alkyl group attached to the sulfur atom of a t-alkyl aryl sulfide.

It is another object to provide a method for effectively cleaving a sec-alkyl group attached to the sulfur atom of a sec-alkyl aryl sulfide.

It is yet a further object to provide a sulfide cleavage for cleaving branched-chain S-alkylated thiophenols in high yield and in high purity.

It is still a further object to provide a sulfide cleavage process of commercial utility wherein both thiophenols and olefins are recovered from corresponding S-alkylated thiophenols in high yield and in high purity.

In accordance with this invention, sulfide cleavage of a branched-chain alkyl aryl sulfide is accomplished by reacting the sulfide in the presence of a sulfide cleavage solid acid catalyst selected from the group consisting of solid phosphoric acid and natural and synthetic acid clays at a selected sulfide cleavage temperature between about 100° and 400° C. The sulfide cleavage of S-alkylated thiophenols specifically includes the removal of a t-alkyl or sec-alkyl group attached to the sulfur atom. Removal of a sec-alkyl group is more difficult to accomplish than removal of a t-alkyl group and generally requires a higher temperature for effective cleavage. The removal of a t-alkyl group is preferably accomplished at a temperature between 125° and 250° C. The removal of a sec-alkyl group is preferably accomplished at a temperature between 250° and 350° C. At too low a temperature, cleavage is essentially ineffectual; at too high a temperature, undesired side products are formed due to degradation and polymerization.

While catalyst concentration is not critical per se, since heterogeneous catalysis is involved too low a catalyst concentration results in a marked increase in reaction time. Catalyst concentrations of from 1 to 20 percent are preferred. Depending upon the alkyl group to be removed, the reaction temperature used, and the catalyst concentration present, reaction times for liquid phase reactions ranging from 10 minutes to 12 hours are suitable, lower temperatures requiring longer reaction times. Preferred branched-chain alkyl substituents attached to the sulfur atom include from 3 to 16 carbon atoms. Using the catalysts of this invention, it has been found that the cleavage of a higher molecular weight branched-chain alkyl substituent such as sec-butyl proceeds in the same manner and with at least equal effectiveness compared with the cleavage of alkyl groups of lower molecular weight such as isopropyl.

The choice of catalyst is a significant factor in achieving sulfide clevage in yields of practical significance and of commercial utility. A successful catalyst for accomplishing sulfide cleavage must actively and selectively remove the t-alkyl or sec-alkyl group attached to the sulfur atom without causing (a) desulfurization of the S-alkylated thiophenol or the cleaved product or (b) significant polymerization of the cleaved products. Thus the evolved olefin should be recoverable as such for reuse in the process. It is further desirable that the catalyst be relatively inexpensive or have a sufficiently long life with respect to its catalytic activity. It should also be chemically stable and inert with respect to the various reactants and reaction products, particularly because of the elevated temperatures generally required for effective sulfide cleavage.

The preferred and effective solid acid catalysts of this invention which are active and selective for the sulfide cleavage of S-alkylated thiophenols and yet do not degrade the thiophenol are selected from the class consisting of solid phosphoric acid and the natural and synthetic clays. Exemplary of effective natural clays are the activated acid-washed bentonites or related montmorillonite-containing clays. Among synthetic clays are silica-alumina, silica-magnesia, and alumina-boria. These acidic activated natural clays and synthetic clays, as well as solid phosphoric acid, are known to the art as catalytic agents in the cracking of gas oil and are commercially available.

Catalysts prepared by activating natural clays by acid treatment are commercially available under the trade names of Filtrol, Super-Filtrol, KSF clay, and the like. The acidic silica-alumina and related synthetic clay catalysts are readily prepared. For conversion of silica to an acidic catalyst, the addition of only a small proportion of alumina (less than one weight percent) is needed, although commercial catalysts may contain as much as 25 weight percent of alumina, usually about 5 to 20 weight percent. Silica-alumina catalyst is exemplary of a preferred one of the synthetic acid clays, which also include alumina-boria and silicia-magnesia catalysts. These cataysts may be prepared be methods known to the art, for example, by precipitating silica from a solution of sodium silicate, preferably removing the sodium ions, and depositing thereon or admixing therewith alumina, magnesia, or the like. The catalyst must be acidic in nature. The acid strength of solid materials can be readily determined by the method of Cheves Walling, J. Am. Chem. Soc. 72, 1164 (1950), or by other methods known to the art. To these clay-type catalysts may be added various promoters, such as zirconia, thoria, vanadia, and the like. Such promoters usually do not constitute more than 15 percent of the catalyst, generally from about 1 to about 10 percent thereof. A suitable silica-alumina catalyst is commercially available under the trade name of Houdry synthetic catalyst, type S–16.

Solid phosphoric acid catalyst, as this term is used in the art, refers to a solid porous granular material, e.g., kieselguhr, silica-gel, etc., which has been impregnated with phosphorus pentoxide or with an acid of phosphorus, e.g., phosphoric acid, and then calcined to produce a desired lower state of hydration of the catalyst. The nature and preparation of solid phosphoric acid catalysts are well known in the polymerization art, and numerous prior disclosures set forth the features of these catalysts. One such commercially available solid phosphoric acid catalyst is known as UOP No. 2; another as UOP No. 4.

Solid phosphoric acid catalyst is particularly effective as a sulfide cleavage catalyst in removing a branched-chain alkyl group attached to the sulfur atom of an S-alkylated thiophenol. The use of the sulfide cleavage technique finds particular applicability in the separation of thiocresol isomers. Thus solid phosphoric acid shows a high degree of effectiveness in cleaving a t-alkyl group attached to the sulfur atom of an S-alkylated thiocresol while at the same time causing no desulfurization of the thiocresol. In the sulfide cleavage of the t-butyl group from either m-tolyl or p-tolyl t-butylated sulfides or from t-butyl 4-t-butyl-o-tolyl sulfide, solid phosphoric acid is preferred as catalyst, a temperature between 125 and 250° C. being preferred; a particularly preferred temperature giving maximal yields and minimal degradation is between 160 and 170° C. at 200 mm. Hg pressure. The pressure in the system is generally a function of the selected temperature employed for a given sulfide cleavage reaction. Reduced pressure is also employed to permit the cleaved products to distil from the system as formed while at the same time maintaining an adequate reaction temperature. A catalyst concentration between 1 and 20 percent by weight of the sulfide is preferred, with a concentration between 5 and 15 percent being particularly preferred and effective.

The sulfide cleavage catalysts of this invention also possess the unique property of functioning as ring dealkylation catalysts in removing a branched-chain alkyl group that is attached to a nuclear carbon atom of the thiophenol. It has been found that while non-degrading catalysts which are effective for ring dealkylation are generally equally effective for sulfide cleavage, where the same type of branched alkyl substituents are involved, the converse does not necessarily apply. Thus certain catalysts suitable for sulfide cleavage cannot be used for ring dealkylation. In practicing the present process, both sulfide cleavage and ring dealkylation can occur in the same operation, the sulfide cleavage occurring first followed by ring dealkylation. Compounds such as t-butyl 4-t-butyl-o-tolyl sulfide or isopropyl 2-isopropylphenyl sulfide may, by such a combined sulfide cleavage and ring dealkylation process, be converted to o-thiocresol and isobutylene or to 2-isopropylthiophenol and propylene, respectively. However, for other reactions, because of the possible formation of undesired side products, it is preferred to separately ring dealkylate C-alkylated thiophenols and separately sulfide cleave S-alkylated thiophenols. Thus the S-alkyl group would first be cleaved from the sulfur atom, forming the C-alkylthiophenol. The latter compound would then be isolated and ring dealkylated.

The reactions that occur during sulfide cleavage are relatively complex and for certain compounds mechanistically may involve disproportionation, isomerization, and desulfurization, as well as the desired sulfide cleavage. However, it has been found that by using the process of this invention in conjunction with a relatively simple selective distillation technique, high yields of thiophenol obtained by sulfide cleavage of the alkyl aryl sulfide may be obtanied wholly independent of the possible interim formation of undesired side products. In such a technique, the sulfide is heated in the presence of the catalyst to a desired sulfide cleavage temperature. The column temperature and pressure are coordinately controlled so that the only product that escapes (other than evolved olefins) is the desired thiophenol which will be lower boiling than the starting S-alkylated reactant. Any S-alkylated reactant is returned to the distillation vessel by reflux. It has been found that a packed distillation column provides a desired scrubbing action so that the evolved thiophenol is obtained in a high degree of purity, other products being returned to the vessel for reflux. It is also apparent that in removing the cleaved thiophenolic product by this technique, equilibrium is not attained, the reaction being shifted toward formation of additional thiophenol.

It has also been found advantageous in certain instances, particularly in cleaving the more difficulty cleavable sec-alkyl aryl sulfides, to incorporate an inert hydrocarbon oil, e.g., a high-boiling paraffin oil, to increase the temperature in the reaction vessel. Thereby, these sulfides may be cleaved at temperatures above their atmospheric boiling point. Also, improvements in conversion and yield, in certain instances, result.

The following examples are intended as illustrative and expository of the invention, and are not to be considered as limitations thereof.

EXAMPLE 1

*Sulfide Cleavage of t-Butyl m-Tolyl and p-Tolyl Sulfides in the Presence of Solid Phosphoric Acid Catalyst*

Following the procedure shown in my joint copending application Serial No. 70,657, filed November 21, 1960, wherein mixed thiocresols were selectively reacted with isobutylene and the recovered t-butyl tolyl sulfides were subjected to fine fractionation, t-butyl m-tolyl sulfide and t-butyl p-tolyl sulfide were separately recovered. These sulfides were then debutylated as follows. A distilling flask was charged with the t-butyl tolyl sulfide and solid phosphoric acid catalyst (UOP No. 2) and then placed on a packed distilling column. The mixture was heated to a reaction temperature between 145 and 185° C. The reaction products were recovered as an overhead product either as gaseous olefins or liquid distillates. Reduced pressures (200 mm. Hg) were employed while providing the desired reaction temperature. Both column temperatures and reflux ratios were adjusted so as to return unreacted materials to the reactor, thereby promoting conversion to the final desired products. Product distillate was redistilled prior to analysis. In each case, almost quantitative yields of the corresponding thiocresols were readily obtained. Isomeric purity was determined by infrared analysis to be 98%+ for run Nos. 1 and 2. The results obtained are shown in Table I.

TABLE I.—SULFIDE CLEAVAGE OF t-BUTYL TOLYL SULFIDES IN THE PRESENCE OF SOLID PHOSPHORIC ACID CATALYST (UOP No. 2)

| Run No. | Reactant | Catalyst (weight percent of feed) | Reaction conditions | | Conversion, percent | Product and yield (mole percent of converted feed) |
|---|---|---|---|---|---|---|
| | | | Temp. °C. | Time, min. | | |
| 1 | t-Butyl m-tolyl sulfide | 10 | 164–167 | 90 | 86 | Metathiocresol, 98%. |
| 2 | t-Butyl p-tolyl sulfide | 10 | 167–184 | 90 | 83 | Parathiocresol, 97%. |
| 3 | t-Butyl m-, p-tolyl sulfide | 15 | 145 | 120 | 76 | Mixed meta- and parathiocresols, 87%. |

EXAMPLE 2

*Sulfide Cleavage of t-Nonyl Phenyl Sulfide*

Thiophenol was alkylated with nonene (propylene trimer) in the presence of $BF_3$-$H_3PO_4$ complex as ring alkylation catalyst. t-Nonyl phenyl sulfide was obtained as a by-product of the alkylation reaction and was recovered in substantially pure form from the reaction mixture by the process disclosed in our copending application, Serial No. 70,596, filed November 21, 1960, and assigned to the assignee of this application. The t-nonyl phenyl sulfide was reacted in the presence of 15 percent by weight of solid phosphoric acid catalyst at a temperature of 300° C. for 3 hours following the procedure described in Example 1. Fifty-nine percent of the t-nonyl phenyl sulfide was converted, the converted material consisting of thiophenol exclusively (100 percent yield).

EXAMPLE 3

*Sulfide Cleavage of Isopropyl Phenyl Sulfide (Batch Reactor)*

Isopropyl phenyl sulfide was subjected to sulfide cleavage over a temperature range of 270–315° C. in the presence of solid phosphoric acid and of activated acid-washed montmorillonite clay respectively as the cleavage catalyst.

In a typical run, a sample of isopropyl phenyl sulfide was contacted with 15 weight percent of catalyst. The reaction vessel temperature was adjusted to the desired reaction temperature, and the column temperature was concomitantly regulated so that the ultimate reaction product, thiophenol, was taken overhead with sufficient reflux so as to return unreacted isopropyl phenyl sulfide to the reaction vessel, propylene passing through the condenser. A high-boiling paraffin oil was included in the reactor to permit operation at temperature above the atmospheric boiling point of the isopropyl phenyl sulfide. The reaction times used varied from 3 to 5 hours. The sulfide cleavage results obtained are summarized in Table II.

TABLE II.—SULFIDE CLEAVAGE OF ISOPROPYL PHENYL SULFIDE (BATCH REACTOR)

[For runs 4 and 5, solid phosphoric acid (UOP No. 2) was used as catalyst. In run 6, silica-alumina (Houdry S-16) was used as catalyst. Catalyst concentration was 15 percent by weight of feed in all three runs]

| Run No. | Reaction conditions | | Conversion, percent | Thiophenol, mole percent of converted feed |
|---|---|---|---|---|
| | Temp., °C. | Residence time, hrs. | | |
| 4 | 270 | 5 | 83 | 50 |
| 5 | 315 | 3 | 81 | 83 |
| 6 | 315 | 3 | 75 | 73 |

EXAMPLE 4

*Sulfide Cleavage of Isopropyl Phenyl Sulfide (Stirred Reactor)*

The procedure and apparatus described above with respect to Example 3 were employed, with the reactor being additionally fitted with an all-glass paddle stirrer to improve contacting of the reactants with the catalyst and to aid in heat transfer between the walls of the reactor and the reaction mixture. Also, a continuous feed technique was used. A high-boiling paraffin oil was in included in the reactor to permit operation at temperatures above the atmospheric boiling point of the isopropyl phenyl sulfide. Results obtained are summarized in Table III. It was noted that in runs 9 and 11, the catalysts used therein showed a higher activity and a longer life than the catalysts used in the other runs.

TABLE III.—SULFIDE CLEAVAGE OF ISOPROPYL PHENYL SULFIDE (STIRRED REACTOR)

[For run 7, solid phosphoric acid (UOP No. 2) was used as catalyst. For runs 8–11, different commercially available samples of activated acid-washed montmorillonite clays were used (KSF clay, Filtrol 20, Filtrol 58, and Filtrol 13, respectively]

| Run No. | Catalyst concn., weight percent | Reaction conditions | | Conversion, percent | Yield of thiophenol, mole percent of converted feed |
|---|---|---|---|---|---|
| | | Temp., °C. | Total time, min. | | |
| 7 | 13 | 310–325 | 187 | 76 | 90 |
| 8 | 8 | 305–330 | 384 | 88 | 92 |
| 9 | 6 | 310–325 | 340 | 86 | 95 |
| 10 | 20 | 312–323 | 159 | 98 | 100 |
| 11 | 7 | 313–325 | 235 | 90 | 93.5 |

EXAMPLE 5

*Sulfide Cleavage of Sec-Butyl Phenyl Sulfide*

Sec-butyl phenyl sulfide was fed to a pressurized reactor at a constant rate by means of a motorized syringe, the reactor consisting of a section of stainless steel pipe containing solid phosphoric acid (UOP No. 2) in the form of pellets. Approximately 10 percent by weight of catalyst was used based on the total amount of sulfide fed. External heating was used, temperatures being measured by means of a thermocouple located in the center of the catalyst bed. The sec-butyl phenyl sulfide was maintained at a temperature of 325° C. for a residence time of 15 minutes. The product mixture obtained was collected in a steel receiver which was pressurized to 50–70 p.s.i.g. with nitrogen to prevent vapor formation in the heated zone. Based on total recovered products, 87 percent of the sec-butyl phenyl sulfide was converted, 69 percent of the recovered material consisting of thiophenol. Isomerization also occurred in this reaction in that sec-butylthiophenol (31 percent) was also obtained.

EXAMPLE 6

*Combined Dealkylation and Sulfide Cleavage of Branched-Chain Thiophenols*

(a) t-ALKYL DEALKYLATION AND CLEAVAGE

Following the procedure shown in Example 1, a sample of t-butyl 4-t-butyl-o-tolyl sulfide was reacted in the presence of 12 percent by weight of solid phosphoric acid catalyst (UOP No. 2) at a temperature of 240° C. for 2 hours. Ninety-three percent of the alkylated thiophenol was converted, o-thiocresol being recovered in a yield of 92 mole percent based on converted material.

(b) SEC-ALKYL DEALKYLATION AND CLEAVAGE (1) A sample of sec-btuyl o-sec-butylphenyl sulfide was similarly reacted in the presence of 15 percent by weight of solid phosphoric acid catalyst. The reaction was performed at a temperature of 310° C. for 3 hours, a high boiling paraffin oil being included in the reactor. Eighty-three percent of the starting material was converted; o-sec-butylthiophenol was recovered in a yield of 49 mole percent based on converted material; 6.5 percent of thiophenol was also obtained.

(2) Similarly, following the procedure shown in Example 1, isopropyl o-isopropylphenyl sulfide was reacted in the presence of 15 percent by weight of solid phosphoric acid catalyst at a temperature of 300–315° C. for 3 hours. Seventy-eight percent of the starting material was converted; o-isopropylthiophenol was recovered in a yield of 67 mole percent based on converted material; 12 percent of thiophenol was also obtained.

(3) Isopropyl 2,6-diisopropylphenyl sulfide was also both dealkylated and sulfide-cleaved following the foregoing procedure, using 15 percent by weight of solid phosphoric acid as catalyst. After reaction at 295–325° C. for 5 hours, a 79 percent conversion was obtained. The principal product obtained consisted of diisopropylthiophenol (56 percent); 16.4 percent of isopropylthiophenol and 3.5 percent of thiophenol were also recovered, mole percent based on converted material.

(4) Isopropyl 2,6-diisopropylphenyl sulfide was reacted in the presence of 13 percent by weight of an acid-washed activated montmorillonite clay (Filtrol 20) using a continuous feed technique in the presence of a paraffin oil, similar to the procedure used in Example 4. A temperature of 309–318° C. for 2 hours was maintained. A conversion of 87 percent occurred. Diisopropylthiophenol was the principal product recovered (38 percent), with 36 percent of isopropylthiophenol and 4.3 percent of thiophenol, based on converted material, being also obtained.

It will of course be readily apparent that many different variants of the process of this invention may be employed depending upon the sulfide being cleaved and the specific reaction parameters used such as catalyst concentration, reaction temperature, time of reaction, and the like. Also, a batch technique or a semi-continuous or continuous process may be employed. These variants are considered as falling within the scope of this invention, which should be determined in accordance with the objects and claims thereof.

We claim:

1. The process for sulfide cleaving an alkyl aryl sulfide containing a branched-chain alkyl group attached to the sulfur atom which comprises heating said sulfide at a temperature between about 100 and 400° C. in the presence of a sulfide cleavage solid acid catalyst selected from the class consisting of solid phosphoric acid and natural and synthetic acid clays to form the corresponding thiophenol and an olefin corresponding to said branched-chain alkyl group.

2. The process according to claim 1 wherein said catalyst is solid phosphoric acid.

3. The process according to claim 1 wherein said catalyst is acidic silica-alumina.

4. The process for sulfide cleaving an alkyl aryl sulfide containing a branched-chain alkyl group attached to the sulfur atom to form a lower boiling thiophenol in high yield which comprises heating said sulfide at a temperature between about 100 and 400° C. in the presence of a sulfide cleavage solid acid catalyst to form said lower boiling thiophenol and an olefin corresponding to said branched-chain alkyl group, and recovering at least the lower boiling thiophenol in high yield.

5. The process for sulfide cleaving an alkyl aryl sulfide containing a t-alkyl group attached to the sulfur atom which comprises heating said sulfide in the presence of a sulfide cleavage solid acid catalyst selected from the class consisting of solid phosphoric acid and natural and synthetic acid clays at a temperature between 125 and 250° C. to form the corresponding thiophenol and an olefin corresponding to said t-alkyl group.

6. The process according to claim 5 wherein said catalyst is solid phosphoric acid.

7. The process for sulfide cleaving an alkyl aryl sulfide containing a sec-alkyl group attached to the sulfur atom which comprises heating said sulfide in the presence of a sulfide cleavage solid acid catalyst selected from the class consisting of solid phosphoric acid and natural and synthetic acid clays at a temperature between 250 and 350° C. to form the corresponding thiophenol and an olefin corresponding to said sec-alkyl group.

8. The process according to claim 7 wherein said catalyst is solid phosphoric acid.

9. The process according to claim 7 wherein said catalyst is an acid-washed activated natural clay.

10. The process for sulfide cleaving an alkyl aryl sulfide containing a branched-chain alkyl group attached to the sulfur atom to form a lower boiling thiophenol in high yield, which comprises charging the sulfide and a sulfide cleavage solid acid catalyst selected from the class consisting of solid phosphoric acid and natural and synthetic acid clays to a distillation apparatus including a reaction vessel and a distillation column, heating said sulfide at a cleavage temperature between about 100 and 400° C. under reflux conditions to form said lower boiling thiophenol and an olefin corresponding to said branched-chain alkyl group, maintaining the vessel and the column at a selected temperature so that unreacted sulfide is returned to the reaction vessel and said olefin and lower boiling formed thiophenol are permitted to escape from the column, and recovering at least said lower boiling thiophenol in high yield.

11. The process according to claim 10 wherein an inert hydrocarbon oil is present in the reaction vessel during the cleavage reaction.

12. The process according to claim 10 wherein said catalyst is solid phosphoric acid.

13. The process according to claim 10 wherein t-butyl o-tolyl sulfide is cleaved and o-thiocresol is recovered in high yield.

References Cited in the file of this patent

Reid: Organic Chemistry of Bivalent Sulfur Compounds, vol. II, page 61 (1960), Chemical Publishing Co., New York, N.Y.